(12) United States Patent
Yang et al.

(10) Patent No.: US 6,376,417 B1
(45) Date of Patent: Apr. 23, 2002

(54) CATALYST FOR THE POLYMERIZATION OF PROPYLENE AND ITS USE

(75) Inventors: Aichun Yang; Zhulan Li; Yun Zhao; Wenbo Song; Juziu Yang; Bingquan Mao; Huiru Yang, all of Beijing (CN)

(73) Assignees: China Petro Chemical Corp., Beijing (CN); Beijing Research Institute of Chemical Industry, Sinopec ( * ) Notice: Subject to any disclaimer, the term of this patent is extended or adjusted under 35 U.S.C. 154(b) by 0 days.

(21) Appl. No.: 09/605,828

(22) Filed: Jun. 29, 2000

(51) Int. Cl.$^7$ .................... B01J 31/00; B01J 37/00; C08F 4/02; C08F 4/60
(52) U.S. Cl. ............... 502/121; 502/125; 502/126; 502/127; 502/132; 502/134
(58) Field of Search .................. 502/121, 125, 502/126, 127, 132, 134

(56) References Cited

U.S. PATENT DOCUMENTS 2,970,989 A * 2/1961 Hoxie ................. 502/124
4,784,983 A   11/1988 Mao et al. ............. 502/111

OTHER PUBLICATIONS

Boor, Ziegler–Natta Catalysts and Polymerizations, pp. 181–184, (1979).

* cited by examiner

Primary Examiner—Mark L. Bell
Assistant Examiner—J. Pasterczyk
(74) Attorney, Agent, or Firm—Shanks & Herbert

(57) ABSTRACT

A catalyst for the polymerization of propylene comprising components (A), (B) and (C) is provided. Component (A) is a solid product prepared by dissolving a halide of magnesium in a solvent system consisting of an organic epoxy compound, an organic phosphorus compound and an inert diluent to form a homogeneous solution; mixing the homogeneous solution with a halide of titanium to form a mixture; precipitating a solid from the mixture in the presence of an auxiliary precipitant; treating the solid with a polycarboxylic ester to load the ester on the solid; and treating the ester loaded solid with the halide of titanium and the inert diluent. Component (B) is an organic aluminium compound, and component (C) is an organic silicon compound. The particle size of the catalyst can be adjusted by increasing the amount of the inert diluent at a low ratio of the epoxy compound to the phosphorus compound.

18 Claims, No Drawings

CATALYST FOR THE POLYMERIZATION OF PROPYLENE AND ITS USE

BACKGROUND OF THE INVENTION

The present invention relates to a catalyst for the polymerization of propylene and a method of using the same in the polymerization of propylene.

It is known that particle size, particle shape and particle size distribution of a catalyst have an important influence on the properties of the polymer manufactured using the catalyst. A balance of an adjustable particle size, desirable particle shape and a narrow particle size distribution of a catalyst is an attribute that all catalyst manufacturers look for. However, it is difficult to keep a good particle shape and a narrow particle size distribution of a catalyst as the size particle of the catalyst increases.

The various polymerization processes in commercial scale require corresponding size particle of the catalyst. Therefore, there is a need in the art to adjust the size of the catalyst particle.

U.S. Pat. No. 4,784,983 discloses a catalyst system for olefinic polymerization comprising components (A), (B) and (C). Component (A) is prepared by dissolving a halide of magnesium in a solvent mixture of an organic epoxy compound and an organic phosphorus compound to form a homogeneous solution; mixing the homogeneous solution with a liquid halide of titanium; adding an auxiliary precipitant such as organic carboxylic acid anhydrides, organic carboxylic acids, ethers and ketones to form a precipitate; adding at least one polycarboxylic acid ester when the precipitate appears; and separating the precipitate from the mixture and treating the separated precipitate with the halide of titanium or a mixture of the halide of titanium in an inert diluent. The activity of the catalyst system of the patent is a very high. The resultant polymer using the catalyst system has very high stereospecificity and a narrow particle size distribution.

However, the main problem with the catalyst system is that it is difficult to adjust the size particle of the catalyst. The particles with irregular shape such as needle or date core-like are formed when the catalyst particles with a large size are prepared using the method of U.S. Pat. No. 4,784,983, especially in the industrial production scale plant. The presence of the catalyst particles with irregular shape deteriorates the properties of the resultant polymer, and may block the catalyst feed or the resultant polymer discharge system.

The above U.S. patent describes that, based on per mole of the magnesium halide, the amount of epoxy compounds added in the magnesium halide solution is about 0.1–10.0 moles and the amount of organic phosphorus compounds added is about 0.1–3.0 moles, which corresponds to the molar ratio of epoxy compounds to organic phosphorus compounds being about 0.033–100 (see column 2; lines 63~68). But, in all the Examples of the specification of the patent, 0.05 mol anhydrous magnesium chloride, 75 ml toluene, 0.1 mol epoxy chloropropane and 0.03 mol tributyl phosphate are used, which corresponds to the molar ratio of epoxy chloropropane to tributyl phosphate being 3.3.

The inventors have found that the use of the large amount of the organic epoxy compounds is the main cause for the formation of the catalyst particles with irregular shape, and the size particle of the catalyst can be adjusted by changing the amount of the inert diluent added to the solvent mixture or system for dissolving the halide of magnesium at a low ratio of the organic epoxy compound to the organic phosphorus compound.

Therefore, the particle shape, particle size and particle size distribution of the catalyst for the polymerization of propylene can be controlled by adjusting the ratio of the organic epoxy compounds to the organic phosphorus compounds and the amount of the inert diluent used. Based on such recognition, the invention has been completed.

SUMMARY OF THE INVENTION

The present invention provides a catalyst for the polymerization of propylene comprising the following components:

(A) A solid catalyst component prepared by dissolving a halide of magnesium in a solvent system consisting of an organic epoxy compound, an organic phosphorus compound and an inert diluent to form a homogeneous solution; mixing the homogeneous solution with a halide of titanium to form a mixture; precipitating a solid from the mixture in the presence of an auxiliary precipitant; treating the solid with a polycarboxylic acid ester to load the ester on the solid; and treating the ester loaded solid with the halide of titanium and the inert diluent, Wherein said auxiliary precipitant is selected from organic anhydrides, organic acids, ethers and ketones, and wherein based on per mole of the halide of magnesium, the amount of the organic epoxy compound is from 0.2 to 5 moles, and the molar ratio of the organic compound to the organic phosphorus compound is from 0.5 to 1.6;

(B) An organic aluminium compound having the formula $AlR_nX_{3-n}$ wherein each R is independently hydrogen or a hydrocarbyl group having 1–20 carbon atoms, X is a halogen, and n is a number of from 1 to 3;

(C) An organic silicon compound having the formula $R_nSi(OR')_{4-n}$ wherein R and R' each is independently selected from alkyl, cycloalkyl, aryl and haloalkyl and n is an integer of from 0 to 3;

Wherein the ratio of component (B) to component (A) is, measured as the molar ratio of aluminium to titanium, from 5 to 1000, and the ratio of component (C) to component (A) is, measured as the molar ratio of silicon to titanium, from 2 to 100

The present invention also provides a method of using the catalyst in the polymerization of propylene.

DETAILED DESCRIPTION OF THE INVENTION

In a preferred embodiment, solid catalyst component (A) is prepared by the following method. A halide of magnesium is first dissolved in a solvent system consisting of an organic epoxy compound, an organic phosphorus compound and an inert diluent at a temperature of from 0 to 100° C., preferably from 30 to 70° C. with stirring to form a homogenous solution. The homogenous solution is then mixed with a halide of titanium at a temperature of from −35 to 60° C., preferably from −30 to 5° C. in the presence of an auxiliary precipitant to form a mixture. A polycarboxylic acid ester is added to the mixture after or before a solid is precipitated to load at least part of the ester on the solid. The temperature of the resultant mixture is raised to 60~110° C. to form a suspension, the suspension is stirred at that temperature for from 10 minutes to 10 hours, then a solid is precipitated from the suspension. After separation, the separated solid is treated with the halide of titanium and the inert diluent, is then washed with toluene and hexane to obtain a solid catalyst component (A).

Suitable halide of magnesium includes magnesium halide such as magnesium chloride, magnesium bromide and magnesium iodide; a complex of magnesium halide with water or alcohol; a derivative of magnesium halide wherein a halogen atom is substituted by a hydrocarboxyl or halohydrocarboxyl group; and like.

Suitable organic epoxy compound includes oxides of aliphatic olefins, aliphatic diolefins, halogenated aliphatic olefins, and halogenated aliphatic diolefins, glycidyl ethers, cyclic ethers and the like having 2–8 carbon atoms. Examples of suitable organic epoxy compounds are ethylene oxide, propylene oxide, butylene oxide, butadiene dioxide, epoxy chloropropane, methylglycidyl ether, diglycidyl ether, tetrahydrofuran, and the like.

Suitable organic phosphorus compound includes hydrocarbyl esters of phosphoric acid or phosphorus acid, e.g. trimethyl phosphate, triethyl phosphate, tributyl phosphate, triphenyl phosphate, trimethyl phosphite, triethyl phosphite, tributyl phosphite, triphenyl phosphite and the like.

Suitable insert diluent includes hexane, hepane, octane, benzene, toluene, xylene, 1,2-dichloroethane, chlorobenzene and other hydrocarbons or halohydrocarbons.

The amounts of the components of the halide of magnesium solution are as follow: based on per mole of the halide of magnesium, the amount of the organic epoxy compound is from 0.2 to 5 moles, preferably from 0.5 to 2 moles, the molar ratio of the organic epoxy compound to the organic phosphorus compound is from 0.5 to 1.6, preferably from 0.9 to 1.4 and the amount of the inert diluent is from 1,200 to 2,400 ml, preferably from 1,400 to 2,000 ml.

The halide of titanium used in the preparation of the solid catalyst component (A) of the invention is a compound having the formula $TiX_n(OR)_{4-n}$ wherein X is a halogen, each R is independently a hydrocarbyl and n is an integer of from 0 to 4. Examples of the compounds are titanium tetrachloride; titanium tetrabromide, titanium tetraiodide, tetrabutoxy titanium, tetraethoxy titanium, chlorotriethoxy titanium, dichlorodiethoxy titanium, trichloroethoxy titanium and the like.

The amount of the halide of titanium used is from 0.5 to 150 moles, preferably from 1 to 20 moles, based on per mole of the halide of magnesium.

The auxiliary precipitant according to this invention includes organic acid anhydrides, organic acids, ketones, ethers and any combination thereof, such as acetic anhydride, phthalic anhydride, succinic anhydride, maleic anhydride, pyromellitic dianhydride, acetic acid, propionic acid, butyric acid, acrylic acid, methacrylic acid, acetone, methyl ethyl ketone, benzophenone, dimethyl ether, diethyl ether, dipropyl ether, dibutyl ether, diamyl ether and the like.

The amount of the auxiliary precipitant used is from 0.03 to 1.0 moles, preferably from 0.05 to 0.4 moles, based on per mole of the halide of magnesium.

The polycarboxylic acid ester suitable for this invention includes aliphatic and aromatic polycarboxylic acid esters. Examples of these esters include diethyl malonate, dibutyl malonate, diethyl adipate, dibutyl adipate, diethyl sebacate, dibutyl sebacate, di-n-butyl phthalate, di-isobutyl phthalate, di-isoocytyl phthalate, diethyl maleate, di-n-butyl maleate, diethyl naphthalene dicarboxylate, dibutyl naphthalene dicarboxylate, triethyl trimellitate, tributyl trimellitate, triethyl hemimellitate, tributyl hemimellitate, tetraethyl pyromellitate, tetrabutyl pyromellitate, and the like.

The amount of the polycarboxylic acid ester used is from 0.0019 to 0.01 moles, preferably from 0.0040 to 0.0070 moles, based on per mole of the halide of magnesium.

Component (B) is an organic aluminum compound having the formula $AlR_{n'} X_{3-n'}$ wherein each R is independently hydrogen, or a hydrocarbon group having 1–20 carbon atoms, preferably an alkyl, aralkyl or aryl group; X is a halogen, preferably chlorine or bromine; and n' is a number of from 1 to 3. Examples of the compounds are trialkyl aluminums such as trimethyl aluminum, triethyl aluminum, tri-isobutyl aluminum and trioctyl aluminum; hydrogenated alkyl aluminums such as diethyl aluminum hydride and di-isobutyl aluminum hydride; halogenated alkyl aluminums such as diethyl aluminum chloride, di-isobutyl aluminum chloride, sesquiethyl aluminum sesquichloride and ethyl aluminum dichloride, with triethyl aluminum and tri-isobutyl aluminum being preferred.

Component (C) is an organic silicon compound having the formula $R_{n'} Si(OR')_{4-n'}$ wherein n' is an integer of from 0 to 3; R and R' each is independently is alkyl, cycloalkyl, aryl, or haloalkyl group. Examples of such compounds are trimethyl methoxysilane, trimethyl ethoxysilane, methyl cyclohexyl dimethoxy silane, dibutyl dimethoxy silane, dimethyl dimethoxysilane, dimethyl diethoxysilane, diphenyl dimethoxysilane, diphenyl diethoxysilane, phenyl triethoxysilane, pheyl trimethoxysilane, and the like.

In the catalyst of the invention, the molar ratio of aluminium in component (B) to titanium in component (A) is from 5 to 1000, preferably from 100 to 800, and the molar ratio of silicon in component (C) to titanium in component (A) is from 2 to 100, preferably from 8 to 32.

The components (A), (B) and (C) of the catalyst of the invention can be used directly or after pre-complexing in the polymerization process.

The catalyst of the invention can be used in the homopolymerization of propylene or the copolymerization of propylene with other α-olefins such as ethylene, 1-butylene, 4-methyl-1-pentane, 1-hexylene, and 1-octylene.

Liquid-phase polymerization and gas-phase polymerization can both be employed.

In comparison with the prior art, the catalyst of the present invention when used in the polymerization of propylene has significant advantages as follows:

1. The shape of the catalyst particles is spherical due to a change of the composition of the solvent system for dissolving the halide of magnesium, i.e. the ratio of the organic epoxy compound to the organic phosphorus compound lower than that in the prior art.

2. The catalyst particles with a large size of the present invention can obtained by increasing the amount of the inert diluent at a low ratio of the organic epoxy compounds to the organic phosphorus compounds (see Examples 1, 9 and 10 below). The shape of the catalyst particles in U.S. Pat. No. 4,784,983 is good when the particle size of the catalyst is small, but the catalyst particles with an irregular shape such as bar-like or date core-like are formed when the amount of the inert diluent increases at a high ratio of the organic epoxy compound to the organic phosphorus compound (see comparative examples 2~4 below).

3. A catalyst with a larger particle size, prepared by using magnesium chloride solution with the same composition as disclosed in the Examples of U.S. Pat. No. 4,784,983 except the amount of toluene is increased, is tested in a commercial scale loop tube system (provided by Himont Company, U.S.A., 70,000 ton polypropylene/year). Polypropylene with high quality can be obtained. However, the lines of the system sometime are blocked and shut down due to the presence of the catalyst particles with the irregular shape. The catalyst of the present invention is tested in the same system for about 2,000 hours. The polypropylene of high quality can be obtained. The bulk density of polypropylene is high.

In order that the invention may be more fully understood, the following Examples and Comparative Examples are given by way of illustration only.

EXAMPLE 1

1. Preparation of Solid Catalyst Component (A):

Anhydrous magnesium chloride (0.05 mol), toluene (95 ml), epoxy chloropropane (EPC) (0.05 mol) and tributyl phosphate (TBP) (0.046 mol) were introduced into a reactor which has thoroughly been purged with highly purified nitrogen. The temperature was raised to 50° C. with stirring, and the mixture was then maintained at that temperature for 2.5 hours, while the solids were dissolved completely. Phthalic anhydride (0.0095 mol) was added to the solution, and then the solution was maintained for an additional 1 hour at 50° C. The solution was cooled to −25° C. Then titanium tetrachloride (56 ml) was added dropwise over a course of 1 hour. The solution was heated to 80° C., while a solid product is precipitated. Diisobutyl Phthalate (0.0056 mol) was added and the mixture was maintained at the temperature of 80° C. for 1 hour. The solid portion was collected by filtration and washed with toluene (2×100 ml). A brown-yellow solid precipitate was obtained. The solid was then treated with toluene (60 ml) and titanium tetrachloride (40 ml) for 2 hours at 90° C. After the filtrate was removed, the treatment step is repeated. The solid was washed with toluene (3×100 ml), and then with hexane (2×100 ml) to obtain 5.9 g of a solid which contained 1.93% by weight of titanium, 19.80% by weight of magnesium and 9.3% by weight of diisobutyl phthalate.

2. Liquid Phase Bulk Polymerization

Triethyl aluminum (0.0025 mol), methyl cyclohexyl dimethoxysilane (0.0001 mol) and solid catalyst component (A) (10 mg) prepared as above were introduced into a 5-liter stainless steel autoclave which has been thoroughly purged with propylene. After introducing 2.5 L propylene and 0.046 mol hydrogen, the temperature was raised to 70° C. Propylene was polymerized for 2 hours. The amount of the resulting polymer was 517 g. The results were shown in Table 1.

COMPARATIVE EXAMPLES 1

1. Preparation of a Solid Catalyst Component

Anhydrous magnesium chloride (0.05 mol), toluene (75 ml), epoxy chloropropane (EPC) (0.1 mol) and tributyl phosphate (TBP) (0.03 mol) were introduced into a reactor which has thoroughly been purged with highly purified nitrogen. The temperature was raised to 50° C. with stirring, and the mixture was then maintained at that temperature for 2.5 hours, while the solids dissolved completely. Phthalic anhydride (0.008 mol) was added to the solution, and then the solution was maintained for an additional 1 hour at 50° C. The solution was cooled to −25° C. Titanium tetrachloride (56 ml) was added dropwise over a course of 1 hour. The solution was heated to 80° C., while a solid product is precipitated. Diisobutyl Phthalate (0.0056 mol) was added and the mixture was maintained at the temperature of 80° C. for 1 hour. The solid portion was collected by filtration and washed with toluene (2×100 ml). A brown-yellow solid precipitate was obtained. The solid was then treated with toluene (60 ml) and titanium tetrachloride (40 ml) for 2 hours at 90° C. After the filtrate was removed, the treatment step is repeated. The solid was washed with toluene (3×100 ml), and then with hexane (2×100 ml) to obtain 5.6 g of a solid which contained 1.85% by weight of titanium, 19.40% by weight of magnesium and 8.52% by weight of diisobutyl phthalate.

2. Liquid Phase Bulk Polymerization

Liquid phase bulk polymerization of example 1 was followed except that solid catalyst component (A) of example 1 was changed to the solid catalyst component of this comparative example. The results were shown in Table 1.

EXAMPLES 2–3

Example 1 was followed except that the amount of toluene was changed to 85 ml and 100 ml, respectively. The results were shown in Table 2.

COMPARATIVE EXAMPLE 2–4

Comparative example 1 was followed except that the amount of toluene was changed to 85 ml, 90 ml and 95 ml, respectively. The results were shown in Table 3.

EXAMPLES 4–7

Example 1 was followed except that the amount of epoxy chloropropane was changed to 0.045 mol, 0.047 mol, 0.057 mol and 0.064 mol, respectively. The results were shown in Table 4.

EXAMPLES 8–10

Example 1 was followed except that the amount of tributyl phosphate was changed to 0.044 mol, 0.05 mol, and 0.055 mol, respectively. The results were shown in Table 4.

EXAMPLE 11

Example 1 was followed except that diisobutyl phthalate (0.0056 mol) was changed to dibutyl phthalate (0.0038 mol). The results were shown in Table 5.

In the following tables, R is an abbreviation of roundness, AR is an abbreviation of aspect ratio, and BD is an abbreviation of bulk density. The R and AR values are determined by using Leica Q 5001W Image meter.

TABLE 1

| Example | Catalyst properties | | Polymer properties | | | | | | | | | |
| | Ti | Activity | TII | BD | Particle shape | | Particle size distribution | | | | | |
| No. | wt % | kgPP/g cat. | % | g/ml | R | AR | >900μ | >450μ | >280μ | >180μ | >154μ | <154μ |
| Ex. 1 | 1.93 | 51.7 | 98.22 | 0.455 | 1.28 | 1.25 | 2.2 | 91.1 | 3.8 | 0.9 | 0.8 | 1.2 |
| Co. Ex. 1 | 1.85 | 46.5 | 97.28 | 0.494 | 1.15 | 1.22 | 5.2 | 29.7 | 63.7 | 1.5 | 0.2 | 0.3 |

TABLE 2

| Example No. | Formulation | | | Catalyst properties | | Polymer properties | | | | | | | | |
|---|---|---|---|---|---|---|---|---|---|---|---|---|---|---|
| | ECP mol | TBP mol | toluene ml | Particle size μm | Activity kgPP/g cat. | BD g/ml | Particle shape | | Particle size distribution | | | | | |
| | | | | | | | R | AR | >900μ | >450μ | >280μ | >180μ | >154μ | <154μ |
| Ex. 9 | 0.05 | 0.046 | 85 | 4.38 | 44.0 | 0.470 | 1.18 | 1.34 | 1.8 | 44.5 | 47.5 | 4.5 | 0.7 | 1.0 |
| Ex. 1 | 0.05 | 0.046 | 95 | 16.60 | 51.7 | 0.455 | 1.28 | 1.25 | 2.2 | 91.1 | 3.8 | 0.9 | 0.8 | 1.2 |
| Ex. 10 | 0.05 | 0.046 | 100 | 27.15 | 41.1 | 0.445 | 1.38 | 1.23 | 56.3 | 23.0 | 15.8 | 2.5 | 1.2 | 1.3 |

TABLE 3

| Example No. | Formulation | | | Particle shape of catalyst |
|---|---|---|---|---|
| | ECP (mol) | TBP (mol) | toluene (ml) | |
| Co. Ex. 1 | 0.1 | 0.03 | 75 | granular |
| Co. Ex. 2 | 0.1 | 0.03 | 85 | 8 × 63 μm bar-like |
| Co. Ex. 3 | 0.1 | 0.03 | 85 | 15 × 65 μm large bar-like, minor part of larger granular |
| Co. Ex. 4 | 0.1 | 0.03 | 95 | long 40 μm date core-like |

TABLE 4

| Example No. | Formulation | | Catalyst properties | | Polymer properties | | | | | | | | |
|---|---|---|---|---|---|---|---|---|---|---|---|---|---|
| | ECP mol | TBP mol | Ti wt % | Activity kgPP/g cat. | BD g/ml | Particle shape | | Particle size distribution | | | | | |
| | | | | | | R | AR | >900μ | >450μ | >280μ | >180μ | >154μ | <154μ |
| Ex. 4 | 0.045 | 0.046 | 1.98 | 56.0 | 0.474 | 1.29 | 1.52 | 52 | 27.5 | 18.8 | 1.4 | 0.1 | <0.1 |
| Ex. 5 | 0.047 | 0.046 | 1.93 | 50.0 | 0.481 | 1.17 | 1.20 | 62.0 | 26.6 | 10.7 | 0.9 | 0.1 | 0.1 |
| Ex. 1 | 0.05 | 0.046 | 1.93 | 51.7 | 0.455 | 1.28 | 1.25 | 2.2 | 91.1 | 3.8 | 0.9 | 0.8 | 1.2 |
| Ex. 6 | 0.057 | 0.046 | 2.26 | 52.4 | 0.450 | 1.30 | 1.34 | 12.6 | 84.9 | 1.9 | 0.4 | <0.1 | <0.1 |
| Ex. 7 | 0.064 | 0.046 | 1.87 | 51.6 | 0.488 | 1.18 | 1.28 | 2.5 | 26.5 | 69.5 | 1.2 | 0.2 | 0.2 |
| Ex. 8 | 0.05 | 0.044 | 1.80 | 34.0 | 0.485 | 1.20 | 1.28 | 1.9 | 89.5 | 6.3 | 1.0 | 0.6 | 0.7 |
| Ex. 1 | 0.05 | 0.046 | 1.93 | 51.7 | 0.455 | 1.28 | 1.25 | 2.2 | 91.1 | 3.8 | 0.9 | 0.8 | 1.2 |
| Ex. 9 | 0.05 | 0.050 | 1.75 | 39.0 | 0.480 | 1.19 | 1.23 | 3.0 | 66.3 | 29.7 | 0.8 | 0.1 | 0.3 |
| Ex. 10 | 0.05 | 0.055 | 2.03 | 57.0 | 0.458 | 1.22 | 1.35 | 1.3 | 9.6 | 12.8 | 72.5 | 2.9 | 1.2 |

TABLE 5

| Example No. | Catalyst properties | | Polymer properties | | | | | | | | |
|---|---|---|---|---|---|---|---|---|---|---|---|
| | Ti wt % | Activity kgPP/gcat | BD g/ml | Particle shape | | Particle size distribution | | | | | |
| | | | | R | AR | >900μ | >450μ | >280μ | >180μ | >154μ | <154μ |
| Ex. 11 | 1.92 | 46.7 | 0.480 | 1.22 | 1.24 | 2.6 | 88.6 | 7.9 | 0.7 | 0.1 | 0.1 |

What is claimed is:

1. A catalyst for the polymerization of propylene comprising:
    (A) a solid catalyst component prepared by dissolving a halide of magnesium in a solvent system consisting of an organic epoxy compound, an organic phosphorus compound and a first inert diluent to form a homogenous solution; mixing the homogenous solution with a first halide of titanium to form a mixture; precipitating a solid from the mixture in the presence of an auxiliary precipitant; treating the solid with a polycarboxylic acid ester to load the ester on the solid; and treating the ester loaded solid with a second halide of titanium and a second inert diluent;
    wherein said auxiliary precipitant being selected from the group consisting of organic anhydrides, organic acid, ethers and ketones; and wherein based per mole of the halide of magnesium, the amount of the organic epoxy compounds is from 0.2 to 5 moles, and the molar ratio of the organic epoxy to the organic phosphorus compounds is from 0.5 to 1.6;
    (B) an organic aluminum compound having the formula $AlR_nX_{3-n}$ wherein each R is independently hydrogen or hydrocarbyl group having 1–20 carbon atoms, X is a halogen, and n is a number from 1 to 3; and
    (C) an organic silicon compound having the general formula $R_nSi(OR')_{4-n}$ where R and R' each is independently selected from the group consisting of alkyl, cycloalkyl, aryl and haloalkyl and n is an integer from 0 to 3;
    wherein the ratio of component (B) to component (A) is, measured as the molar ratio of aluminum to titanium, from 5 to 1000, and the ratio of component (C) to component (A) is, measured as the molar ratio of silicon to titanium, from 2 to 100.

2. The catalyst according to claim 1, wherein based on per mole of the halide of magnesium, the amount of the first halide of titanium added to component (A) is from 0.5 to 150 moles, the amount of the auxiliary precipitant is from 0.03 to 1.0 moles, and the amount of the polycarboxylic acid ester is from 0.0019 to 0.01 moles.

3. The catalyst according to claim 1, wherein, based on per mole of the halide of magnesium, the amount of the organic epoxy compound is from 0.6 to 2 moles, the molar ratio of the organic epoxy compound to the organic phosphorus compounds is from 0.9 to 1.4, and the amount of the first inert diluent is from 1200 to 2400 ml.

4. The catalyst according to claim 1, wherein said halide of magnesium is selected from the group consisting of magnesium halide, complexes of magnesium halide with water or alcohol, a derivative of magnesium halide wherein a halogen atom is substituted by a hydrocarboxyl group or halohydrocarboxyl group, and any combination thereof.

5. The catalyst according to claim 1, wherein said organic epoxy compound is selected from the group consisting of ethylene oxide, propylene oxide, butylene oxide, butadiene oxide, butadiene dioxide, epoxy chloropropane, methylglycidyl ether, diglycidyl ether, tetrahydrofuran, and any combination thereof.

6. The catalyst according to claim 1, wherein said organic phosphorus compound is selected from the group consisting of trimethyl phosphate, triethyl phosphate, tributyl phosphate, triphenyl phosphate, trimethyl phosphite, triethyl phosphite, tributyl phosphite, triphenyl phosphite, and any combination thereof.

7. The catalyst according to claim 1, wherein said auxiliary precipitant is selected from the group consisting of acetic anhydride, phthalic anhydride, succinic anhydride, maleic anhydride, pyromellitic dianhydride, acetic acid, propionic acid, butyric acid, acrylic acid, methacrylic acid, acetone, methyl ethyl ketone, benzophenone, dimethyl ether, diethyl ether, dipropyl ether, dibutyl ether, diamyl ether, and any combination thereof.

8. The catalyst according to claim 1, wherein said polycarboxylic acid ester is selected from the group consisting of diethyl malonate, dibutyl malonate, diethyl adipate, dibutyl adipate, diethyl sebacate, dibutyl sebacate, di-n-butyl phthalate, di-isobutyl phthalate, di-isoocytyl phthalate, diethyl maleate, di-n-butyl maleate, diethyl naphthalene dicarboxylate, dibutyl naphthalene dicarboxylate, triethyl trimellitate, tributyl trimellitate, triethyl hemimellitate, tributyl hemimellitate, tetraethyl pyromellitate, tetrabutyl pyromellitate, and any combination thereof.

9. The catalyst according to claim 1, wherein said halide of titanium is selected from the group consisting of titanium tetrachloride, titanium tetrabromide, titanium tetraiodide, chlorotriethoxy titanium, dichlorodiethoxy titanium, trichloroethoxy titanium, and any combination thereof.

10. A catalyst component prepared by dissolving a halide of magnesium in a solvent system consisting of an organic epoxy compound, an organic phosphorus compound and a first inert diluent to form a homogenous solution; mixing the homogenous solution with a first halide of titanium to form a mixture; precipitating a solid from the mixture in the presence of an auxiliary precipitant; treating the solid with a polycarboxylate acid ester to load the ester on the solid; and treating the ester loaded with a second halide of titanium and a second inert diluent;

wherein said auxiliary precipitant being selected from the group consisting of organic anhydrides, organic acids, ethers and ketones; and wherein based per mole of the halide of magnesium, the amount of the organic epoxy compounds is from 0.2 to 5 moles, and the molar ratio of the organic epoxy to the organic phosphorus compounds is from 0.5 to 1.6.

11. The catalyst according to claim 10, wherein said halide of titanium is selected from the group consisting of titanium tetrachloride, titanium tetrabromide, titanium tetraiodide, chlorotriethoxy titanium, dichlorodiethoxy titanium, trichloroethoxy titanium, and any combination thereof.

12. The catalyst component according to claim 10, wherein, based on per mole of the halide of magnesium, the amount of the first halide of titanium is from 0.5 to 150 moles, the amount of the auxiliary precipitant is from 0.03 to 1.0 moles, and the amount of the polycarboxylic acid ester is from 0.0019 to 0.01 moles.

13. The catalyst according to claim 10, wherein based on per mole of the halide of magnesium, the amount of the organic epoxy compound is from 0.6 to 2 moles, the molar ratio of the organic epoxy compound to the organic phosphorus compounds is from 0.9 to 1.4, and the amount of the first inert diluent is from 1200 to 2400 ml.

14. The catalyst component according to claim 10, wherein said halide of magnesium is selected from the group consisting of magnesium halide, complexes of magnesium halide with water or alcohol, a derivative of magnesium halide wherein a halogen atom is substituted by a hydrocarboxyl group or halohydroxycarboxyl group, and any combination thereof.

15. The catalyst component according to claim 10, wherein said organic epoxy compound is selected from the group consisting of ethylene oxide, propylene oxide, butylene oxide, butadiene oxide, butadiene dioxide, epoxy chloropropane, methylglycidyl ether, diglycidyl ether, tetrahydrofuran, and any combination thereof.

16. The catalyst component according to claim 10, wherein said organic phosphorus compound is selected from the group consisting of trimethyl phosphate, triethyl phosphate, tributyl phosphate, triphenyl phosphate, trimethyl phosphite, triethyl phosphite, tributyl phosphite, triphenyl phosphite, and any combination thereof.

17. The catalyst component according to claim 10, wherein said auxiliary precipitant is selected from the group consisting of acetic anhydride, phthalic anhydride, succinic anhydride, maleic anhydride, pyromellitic dianhydride, acetic acid, propionic acid, butyric acid, acrylic acid, methacrylic acid, acetone, methyl ethyl ketone, benzophenone, dimethyl ether, diethyl ether, dipropyl ether, dibutyl ether, diamyl ether, and any combination thereof.

18. The catalyst component according to claim 10, wherein said polycarboxylic acid ester is selected from the group consisting of diethyl malonate, dibutyl malonate, diethyl adipate, dibutyl adipate, diethyl sebacate, dibutyl sebacate, di-n-butyl phthalate, di-isobutyl phthalate, di-isoocytyl phthalate, diethyl maleate, di-n-butyl maleate, diethyl naphthalene dicarboxylate, dibutyl naphthalene dicarboxylate, triethyl trimellitate, tributyl trimellitate, triethyl hemimellitate, tributyl hemimellitate, tetraethyl pyromellitate, tetrabutyl pyromellitate, and any combination thereof.

* * * * *